United States Patent [19]

Hargarten et al.

[11] Patent Number: 5,365,385
[45] Date of Patent: Nov. 15, 1994

[54] METHOD AND APPARATUS FOR MULTIRATE SAMPLING FOR DISK DRIVE SPINDLE CONTROL

[75] Inventors: James W. Hargarten, Lafayette; Steven P. Ward, Louisville, both of Colo.

[73] Assignee: Maxtor Corporation, San Jose, Calif.

[21] Appl. No.: 82,286

[22] Filed: Jun. 24, 1993

[51] Int. Cl.[5] .............. G11B 15/467; G11B 15/52; H02P 5/06; H03D 13/00

[52] U.S. Cl. ............... 360/73.03; 388/814; 388/907.5; 388/912

[58] Field of Search ............ 360/73.03, 73.01, 73.09, 360/73.11, 73.14; 388/805, 809, 812, 814, 820; 369/50

[56] References Cited

U.S. PATENT DOCUMENTS

| | | | |
|---|---|---|---|
| 4,631,681 | 12/1986 | Salazar et al. | 388/809 X |
| 4,710,688 | 12/1987 | Neki et al. | 388/820 X |
| 4,804,894 | 2/1989 | Machida et al. | 388/812 |
| 5,212,434 | 5/1993 | Hsieh | 388/805 X |

*Primary Examiner*—Aristotelis M. Psitos
*Assistant Examiner*—James L. Habermehl
*Attorney, Agent, or Firm*—Blakely, Sokoloff, Taylor & Zafman

[57] ABSTRACT

In the spindle control system of the present invention the compensator is divided into two portions. The first portion is driven by a first clock signal at a first frequency and a second portion is driven by a second clock signal at a second frequency derived from the first clock signal. In particular, the integrator utilizes a clock which increases the time measurement to be a longer interval than the measurement utilized for the remainder of the compensator circuit. This allows the absolute speed to be adjusted with a high resolution independent of the gain. Therefore, the gain can be maintained and the loop dynamics are preserved, maintaining dynamic range and stabilization while increasing the resolution of control of the spin speed.

23 Claims, 3 Drawing Sheets

METHOD AND APPARATUS FOR MULTIRATE SAMPLING FOR DISK DRIVE SPINDLE CONTROL

BACKGROUND OF THE INVENTION

1. Field of the Invention

The present invention relates to the control of spindle speed in a disk drive system. More particularly, the present invention relates to control of the speed of revolution of a disk in a disk drive system.

2. Art Background

The spindle control controls the speed of rotation of the disk in a disk drive. Optimally, it is desirable to maintain the speed of rotation at a constant rate to minimize data errors and accurately track head movement on the disk. As the speed measurement itself is not easily measured, time between events are measured in order to derive a relative speed parameter. For example, time between pulses, hard sector marks and back EMF zero crossings are referenced.

A block diagram illustration of a spindle control is shown in FIG. 1. FIG. 1 is a current drive based system. A similar block diagram is readily apparent for a voltage drive based system. Referring to FIG. 1, clock reference 10 is input to error detector 70 which generates an error signal. The error signal is input to compensator 20 which generates the motor current as output 30 to drive the motor 40 which drives the speed of rotation of the disk drive at a velocity ω 50. The motor speed is converted by converter 60 from a frequency value to a time parameter and is utilized as input to error detector 70. Thus, if the velocity is too high, the error signal will be negative causing compensator 20 to output less motor current and consequently slowing down the motor, and if the velocity is too low, the error signal will be positive causing compensator 20 to output more motor current, thereby speeding up the motor. The compensator serves two purposes. First it puts an integrator in the system which allows the system to have zero steady-state speed error. Secondly, it adds a zero, pole and gain term to the system to allow for stabilization and optimization. The transfer function of the compensator is given by the equation:

$$K_c * \frac{S+Z}{S+P} * \frac{1}{S},$$

where Kc is a generic gain term, 1/s is the integrator, (s+z) is the zero, and (s+p) is the pole. As is known in the art, proper choice of all these terms will allow the designer of the system to adjust the crossover frequency and phase margin for stability as well as tailor the dynamics of the loop to suit the requirements of the application.

The clock reference 10 is a value indicative of the spin speed, particularly a number representing the number of clock ticks between certain events. The error generator 70 compares the actual count to the clock reference 10 and produces an error signal which is proportional to the magnitude of spin speed error which is input to compensator 20 to drive the motor 40.

Because time is measured in terms of events, the system can be configured to be sampled as shown in FIG. 2. The compensator 90 and error generator 85 are accomplished digitally inside a microprocessor. The compensator 90 and error generator 85, preferably implemented by a microprocessor, generate a digital output which is converted to an analog signal via the zero-order hold circuit 95. The output of the zero-order hold circuit 95 is subsequently input to motor 100 to generate the rotation at frequency ω 105. The motor 100 output is further input to the frequency to time conversion circuit 115 which translates the frequency value to a time value that is sampled by switch 117 at specified time intervals. The measured time is obtained via a digital counter (not shown) which counts clock ticks between events or known positions on the disk. Even though the sampling is spatial in nature, when spinning at high speeds, the sampling can be thought of as occurring at a constant rate.

A problem exists with the system as the counter used to perform the time measurement requires a fast clock in order that there is sufficiently high resolution to accurately set the spin speed. For example, if the time is counted between sectors and there were only a hundred counts available, then the spin speed would be quantized to about 1%. One way to solve the problem is to increase the clock speed and therefore measure more counts per event. However, the clock speed is determined by other system considerations, typically the clock speed of the microprocessor utilized in the system. Thus, the designer may not have the freedom to change the system clock speed. Another option is to sample over a longer period of time, for instance two or more hard sectors. This causes the sample rate of the system to be lowered, which is generally an undesirable trade off. Furthermore, the gain of the loop and clock speed are proportional. Thus, if the clock speed is increased, the gain somewhere else in the loop must be decreased to compensate. The compensator is the most ready place to change the overall gain of the system. Lowering this gain can cause output quantization problems, therefore, for example, to cause a single bit of compensator output, a large change in speed would need to occur.

SUMMARY OF THE INVENTION

It is therefore an object of the present invention to provide increased resolution in spin speed without decreasing the sample rate of the control system.

It is an object of the present invention to provide increased resolution in spin speed while maintaining sufficient quantization.

In the spindle control system of the present invention the compensator is divided into two portions. The first portion has an input time reference that is different than the input to the second portion. In particular, the integrator has as its input a longer time reference than the input to the remainder of the compensator. For example, the input to the integrator might be a time reference equal to the time measured over ten hard sectors, while the input to the rest of the compensator might have an input equal to the time measured over one hard sector. As a result, the sampling rate of the remainder of the compensator would be ten times faster than the sampling rate for the integrator section. This allows the absolute speed to be adjusted with a high resolution independent of the gain. Therefore, the gain can be maintained and the loop dynamics are preserved, maintaining sample rate and stabilization while increasing the resolution of control of the spin speed.

BRIEF DESCRIPTION OF THE DRAWINGS

The objects, features and advantages of the present invention will become apparent to one skilled in the art from the following detailed description in which.

DETAILED DESCRIPTION OF THE INVENTION

In the following description for purposes of explanation numerous details are set forth in order to provide a thorough understanding of the present invention. However, it will be apparent to one skilled in the art that these specific details are not required in order to practice the invention. In other instances, well known electrical structures and circuits are shown in block diagram form in order not to obscure the present invention unnecessarily.

Figure 1:
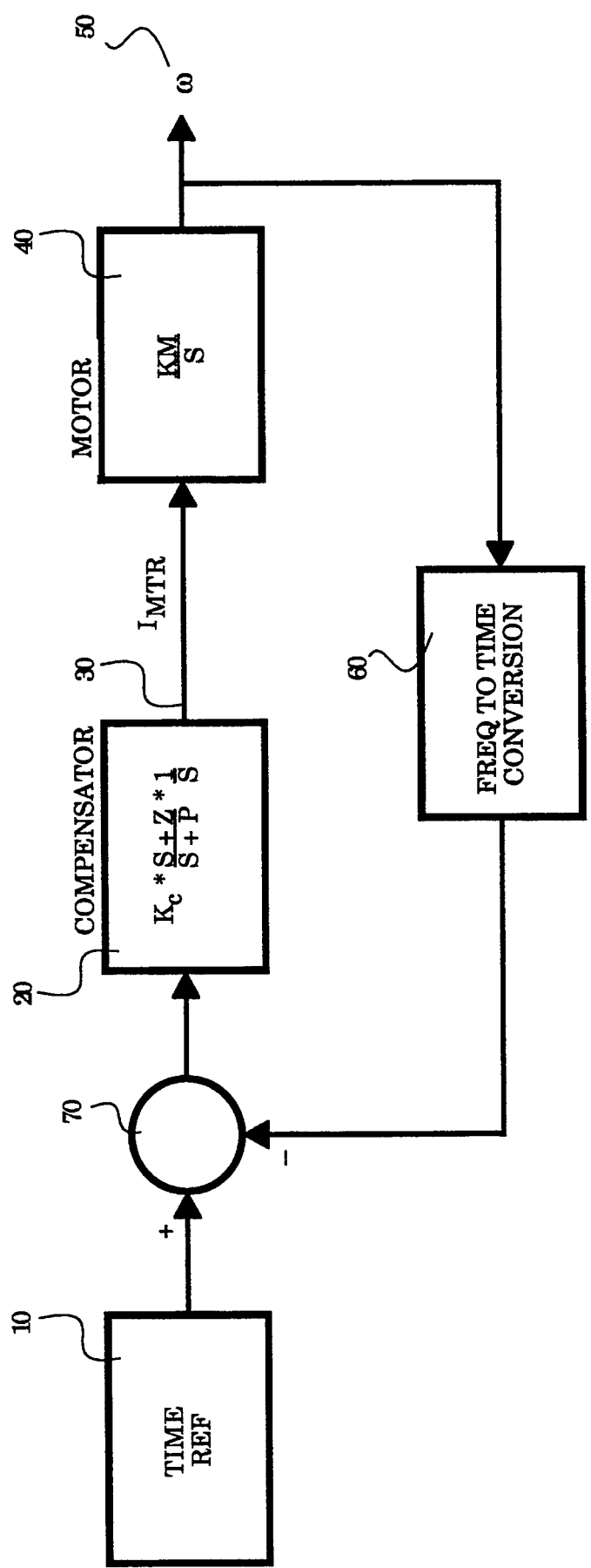
FIG. 1 is a prior art block diagram representation of a spindle control system for a disk drive.
Figure 2:
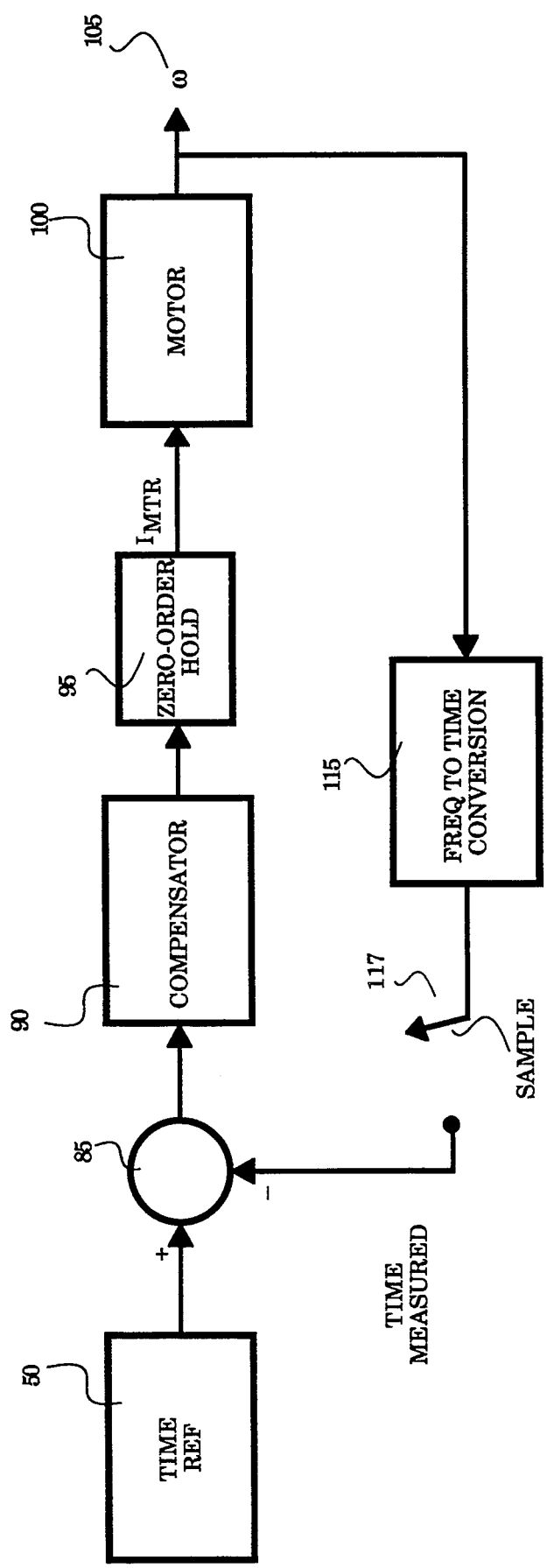
FIG. 2 is an alternate embodiment of a prior art spindle control system which samples during specified time interval.
Figure 3:
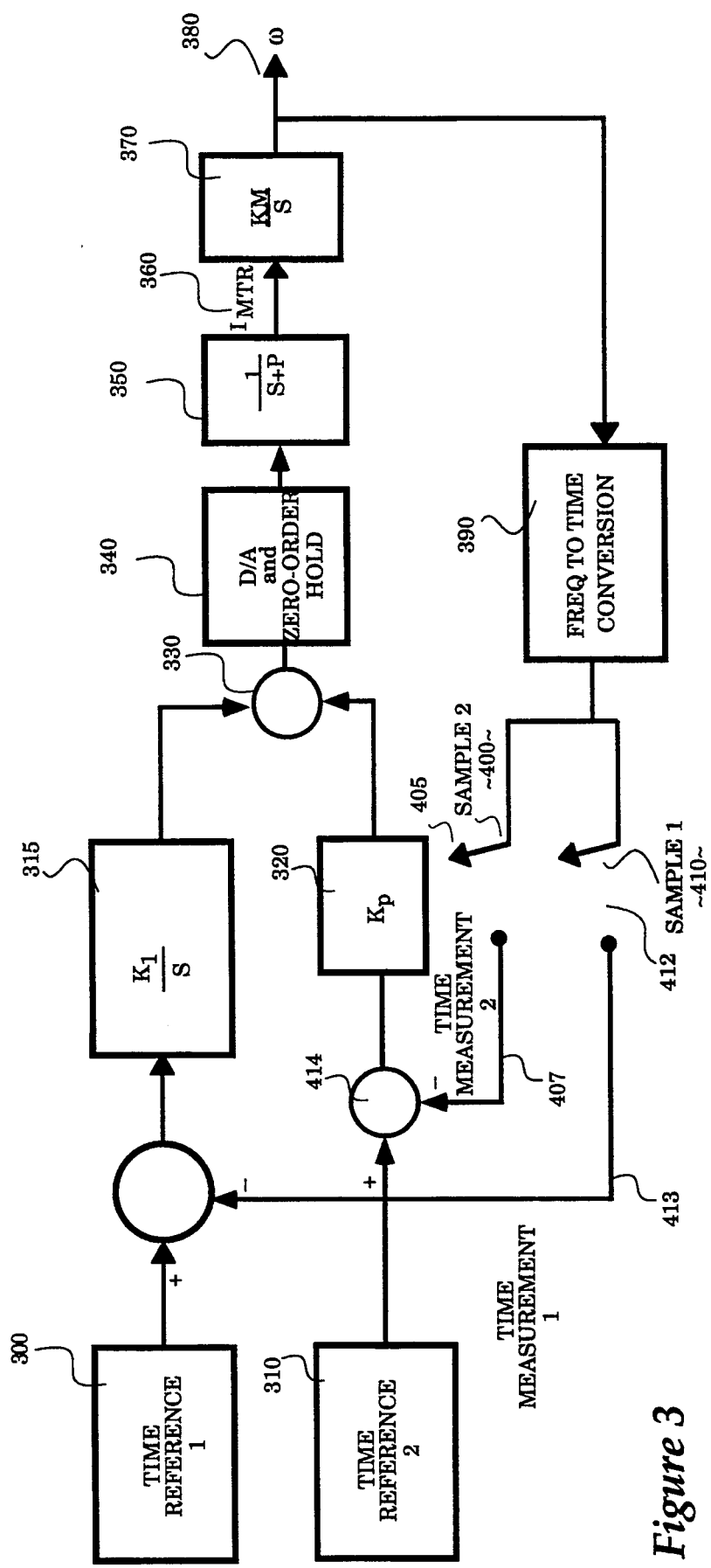
FIG. 3 is a block diagram illustration of the spindle control system of the present invention.

Referring to FIG. 3, two time references 300, 310 are used to operate-the spindle control circuit of the present invention. The first time reference 300 is utilized to generate the error term input to the integrator portion 315 of the circuit. The second time reference 310 is utilized to generate the error term input to the loop gain portion 320 of the circuit. The integrator subcircuit 315 integrates the input and includes a constant $K_1$. The gain subcircuit 320 is a proportional path which multiplies the error term input by a constant. The two portions of the circuit are subsequently combined by summation node 330, to produce-the zero and integrator desired to control the circuit. Therefore, it can be seen that the values of $K_1$ and $K_p$ can be adjusted to adjust the feedback loop dynamics in accordance to the requirements of the particular application. The value of $K_p$ can be adjusted to adjust the overall gain of the loop and the value of $K_1$ can be independently adjusted to change the frequency of where the zero occurs. The output of summation node 330 is converted by digital to analog (D/A) converter 340 and multiplied by the pole Laplace parameter 350 to generate the motor current 360 which is input to drive the motor 370.

The feedback loop converts the frequency $\omega 380$ generated by the motor 70 to a time parameter by converter 390 and is sampled at two sample rates 400, 410, which correspond to time references 300 and 310 utilized by the circuit. The sample rate of the system is set by the desired speed of the system, $\omega$, and the number of measurable events per revolution. For example, the maximum sample rate for a spindle rotating at 3600 rpm with 36 hard sectors per revolution is given by:

$$Fsample2 = 60\ Hz * 36\ hard\ sectors/revolution = 2160\ Hz$$

The resolution of the system for a given clock speed can be increased by, for example, measuring over a period of 6 hard sectors to provide a longer period of time over which to perform the measurement. Therefore, the new sample rate is:

$$Fsample1 = 2160\ Hz/6 = 360\ Hz$$

Therefore, sample switch 405 samples at a rate according to sample2 control 400, generates a time measurement2 407 which is compared to time reference2 310 to generate an error value used to adjust the next input to the loop gain portion 320 of the circuit. Similarly, switch 412 is controlled by sample1 410 to generate time measurement1 413 which is compared to time reference1 300 to generate an error value for input to integrator 315. By splitting the circuit to operate with respect to two time references, the time reference interval for the integrator 315 can be increased in order to more closely control the speed of the spindle while maintaining time measurement2 for purposes of loop gain and control. Preferably, the system still only utilizes a single clock wherein time measurement1 would normally be made over a longer interval than time measurement2, thereby permitting the absolute speed to be adjusted independent of the loop dynamics and further provide for arbitrary resolution of absolute spin speed.

The invention has been described in conjunction with the preferred embodiment. It is evident that numerous alternatives, modifications, variations and uses will be apparent those skilled in the art in light of the foregoing description.

What is claimed is:

1. In a disk drive system, a spindle control circuit to control the speed of revolution of the disk drive, said circuit generating a frequency of rotation $\omega$, said circuit comprising:

a first clock reference operating at a first frequency;

a second clock reference operating at a second frequency;

a compensator circuit for adjusting the frequency of rotation $\omega$ based upon feedback of the output frequency of rotation $\omega$, comprising;

a integrator sub circuit receiving a first clock input and operating at an integrator operating frequency corresponding to the first frequency, said integrator generating signals to minimize steady state speed error, a gain sub circuit receiving a second clock input and operating at a gain operating frequency corresponding to the second frequency, said gain sub circuit generating signals to control the gain of the motor frequency of rotation, combination means for combining the output signals of the integrator sub circuit and the gain sub circuit;

conversion means for generating a signal to operate the motor to rotate the disk drive at a frequency of rotation $\omega$;

feedback means for receiving the value of the frequency $\omega$, comprising;

converting means for converting the frequency $\omega$ to a time value, a first sample means which generates a first sample of the time value at the first frequency, a second sample means which generates a sample of the time value at the second frequency, a first feedback adjustment means for receiving the first sample and comparing it to the first clock reference to provide an integrator error measure to the integrator sub circuit;

a second feedback adjustment means for receiving the second sample and comparing it to the second clock reference to provide a gain error measure to the gain sub circuit;

wherein the clock references can be individually adjusted to provide closer control of the speed of revolution while maintaining adequate gain for control of stabilization at the motor.

2. The spindle control circuit as set forth in claim 1, wherein the first clock reference is slower than the second clock reference.

3. The spindle control circuit as set forth in claim 2, wherein the first clock reference is a fractional multiple of the second clock reference.

4. The spindle control circuit as set forth in claim 1, wherein the first clock reference and second clock reference comprise counts of predetermined events which respectively occur during a first predetermined period of time and second period of time.

5. The spindle control circuit as set forth in claim 4, wherein the first sample and second sample comprise counts of predetermined events which respectively occur during the first predetermined periods of time and second period of time.

6. The spindle control circuit as set forth in claim 1, wherein the integrator sub circuit performs the following function: $K_1/S$, where $1/S$ represents an integration function of the error value input and $K_1$ is a constant.

7. The spindle control circuit as set forth in claim 1, wherein the gain sub circuit performs the following function: Kp, where Kp represents a gain term to increase the gain of the error value input.

8. The spindle control circuit as set forth in claim 1, further comprising La Place means coupled between the combination means and conversion means to combine a La Place pole operator with the output of the combination means.

9. The spindle control circuit as set forth in claim 8, further comprising a digital to analog converter coupled between the combination means and the La Place means to convert the output of the combination means to a analog signal.

10. In a disk drive system, a spindle control circuit to control the speed of revolution of the disk drive, said circuit generates a frequency of rotation ω, said circuit comprising:
a first time reference comprising a value indicative of a number of events which occur during a first predetermined clock period;
a second time reference comprising a value indicative of a number of events which occur during a second predetermined clock period faster than the first predetermined clock period;
a first comparator for comparing the first time reference and a first feedback time reference to adjust a first error value;
a second comparator for comparing the second time reference and a second feedback time reference to adjust a second error value;
an integrator coupled to receive the first error value and generate an output value indicative of the speed of revolution;
a loop gain subcircuit coupled to receive the second error value to generate an output which controls the gain of the circuit;
a combination means to combine the output of the integrator and the loop gain subcircuit;
means for converting the output of the combination means to a value to operate a motor to rotate the disk at a frequency ω; and
a feedback loop for receiving the value of ω; comprising;
a frequency to time converter to convert frequency ω into a time value,
a first switch for sampling the time value, said switch controlled by a first sample rate corresponding to the first time reference to generate a first feedback time reference; and
a second switch for sampling the time value, said switch controlled by a second sample rate corresponding to the second time reference to generate a second feedback time reference;
wherein the first time reference is longer than the second time reference providing a longer period of time to integrate thereby providing closer control of the speed of the revolution while maintaining adequate loop gain for stability of the spindle control circuit.

11. The spindle control circuit as set forth in claim 10, wherein the first predetermined clock period is a fractional multiple of the second predetermined clock period.

12. The spindle control circuit as set forth in claim 11, wherein the integrator performs the following function: $K_1/S$, where $1/S$ represents an integration function of the error value input and $K_1$ is a constant.

13. The spindle control circuit as set forth in claim 10, wherein the loop gain sub circuit performs the following function: Kp, where Kp represents a gain term to increase the gain of the error value input.

14. The spindle control circuit as set forth in claim 10, further comprising a La Place means coupled between the combination means and means for converting to combine a La Place pole operator with the output of the combination means.

15. The spindle control circuit as set forth in claim 14, further comprising a digital to analog converter coupled between the combination means and the La Place means to convert the output of the combination means to a signal.

16. In a disk drive system, a method to control the speed of revolution of the disk drive, said disk drive rotating at a frequency of rotation ω, said method comprising the steps of:
integrating a first error value and generating a signal to control the speed of rotation;
increasing the gain of a second error value by a factor equal to a gain constant to generate a gain signal;
combining the gain signal and the signal to control the speed of rotation to generate a combined gain signal;
converting the combined gain signal to a signal to operate a motor to rotate the disk at a frequency ω;
converting the frequency of rotation ω to a time value signal;
sampling the time value signal according to a first predetermined clock period to generate a first sampled feedback signal;
sampling the time value signal according to a second predetermined clock period to generate a second sampled feedback signal, said first predetermined clock period longer than the second predetermined clock period;
comparing the first sampled feedback signal to a first reference signal to generate the first error value, said first reference signal corresponding to a desired sampled feedback signal during the first predetermined clock period; and
comparing the second sampled feedback signal to a second reference signal to generate the second error value, said second reference signal corresponding to a desired sampled feedback signal during the second predetermined clock period;

wherein the first predetermined clock period is longer than the second predetermined clock period providing a longer period of time over which to integrate thereby providing closer control of the speed of revolution while maintaining adequate loop gain for stability of the spindle control circuit.

17. The method as set forth in claim 16, wherein the first reference and second reference comprise counts of predetermined events which respectively occur during a first predetermined clock period and second clock period when the motor is rotating the disk at the desired frequency of rotation.

18. The method as set forth in claim 16, wherein the first sampled feedback signal and second sampled feedback signal comprise counts of predetermined events which respectively occur during the first predetermined clock period and second clock period.

19. The method as set forth in claim 16, wherein the step of integrating performs the following function: $K_1/S$, where $1/S$ represents an integration function of the error value input and $K_1$ is a constant.

20. The method as set forth in claim 16, wherein the step of increasing the gain performs the following function: Kp, where Kp represents a gain term to increase the gain of the error value input.

21. The method as set forth in claim 16, further comprising the step of combining the combined gain signal with a La Place pole operator to be input to be converted.

22. The method as set forth in claim 21, further comprising the step of converting the combined gain signal to a digital signal prior to combining the signal with the La Place pole operator.

23. The method as set forth in claim 16, wherein the first predetermined clock period is a fractional multiple of the second predetermined clock period.

* * * * *